(12) United States Patent (10) Patent No.: US 8,326,624 B2
Jaiswal (45) Date of Patent: Dec. 4, 2012

(54) DETECTING AND COMMUNICATING BIOMETRICS OF RECORDED VOICE DURING TRANSCRIPTION PROCESS

(75) Inventor: Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/605,734

(22) Filed: Oct. 26, 2009

(65) Prior Publication Data

US 2011/0099011 A1 Apr. 28, 2011

(51) Int. Cl.
*G10L 17/00* (2006.01)
(52) U.S. Cl. ......... 704/246; 704/235; 704/270; 348/468
(58) Field of Classification Search .................. 704/270, 704/270.1, 231, 235, 246, 251, 255, 257; 348/468
See application file for complete search history.

(56) References Cited

U.S. PATENT DOCUMENTS

| | | | |
|---|---|---|---|
| 7,016,844 B2 * | 3/2006 | Othmer et al. ............. | 704/270.1 |
| 7,139,031 B1 * | 11/2006 | Bray .............................. | 348/468 |
| 7,165,033 B1 | 1/2007 | Liberman | |
| 7,222,075 B2 | 5/2007 | Petrushin | |
| 2008/0040110 A1 | 2/2008 | Pereg et al. | |
| 2008/0096533 A1 * | 4/2008 | Manfredi et al. .......... | 455/412.1 |

FOREIGN PATENT DOCUMENTS

WO 2008032787 A1 3/2008

OTHER PUBLICATIONS

W3C Emotion Incubator Group. W3C Incubator Group Report Jul. 10.*
Speech Is the Cure for Medical Records. Copyright 2008 ProQuest Information and Learning Co.*
Kins, Clifford S. Evaluation of Voice Stress Annalysis Technology. 2005.*
Speech is the Cure for Medical Records. Copyright 2008 ProQuest Information and and Learning Company.
Emotion Incubator Group. W3C Incubator Group Report Jul. 10, 2007.
Hopkins, Clifford S. Evaluation of Voice Stress Analysis Technology, 2005.

* cited by examiner

*Primary Examiner* — Huyen X. Vo
(74) *Attorney, Agent, or Firm* — Yee & Associates, P.C.; John R. Pivnichny

(57) ABSTRACT

Determining and communicating biometrics of a recorded speaker in a voice transcription process is provided. An interactive voice response system receives a request from a user for a transcription of a voice file. A profile associated with the requesting user is obtained. The profile comprises biometric parameters and preferences defined by the user. The requested voice file is analyzed for biometric elements according to the parameters specified in the user's profile. In response to detecting biometric elements in the voice file that conform to the parameters specified in the user's profile, a transcription output of the voice file is modified according to the preferences specified in the user's profile for the detected biometric elements to form a modified transcription output file. The modified transcription output file is provided to the requesting user.

19 Claims, 4 Drawing Sheets

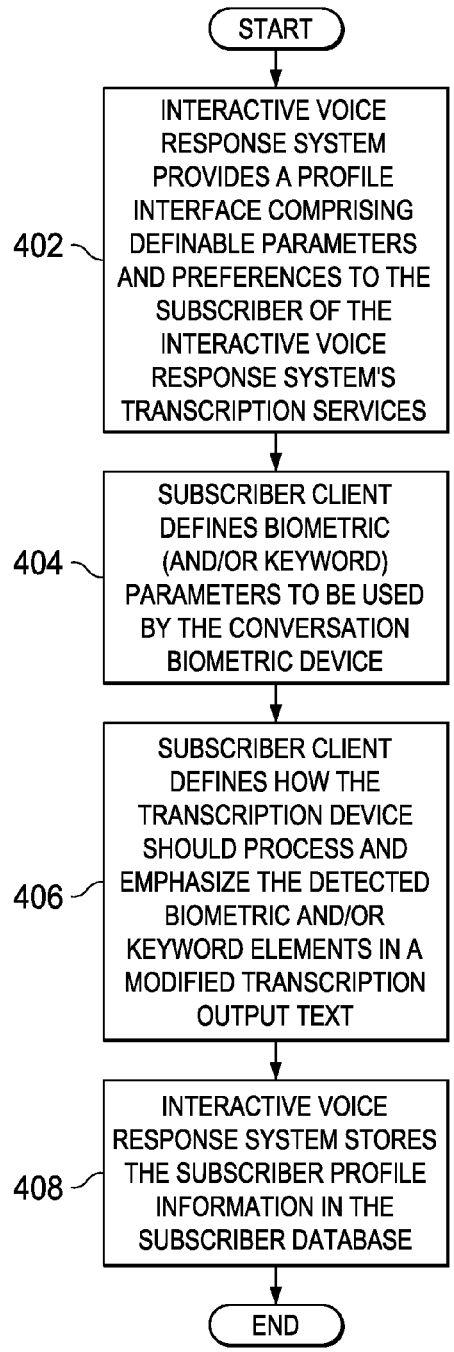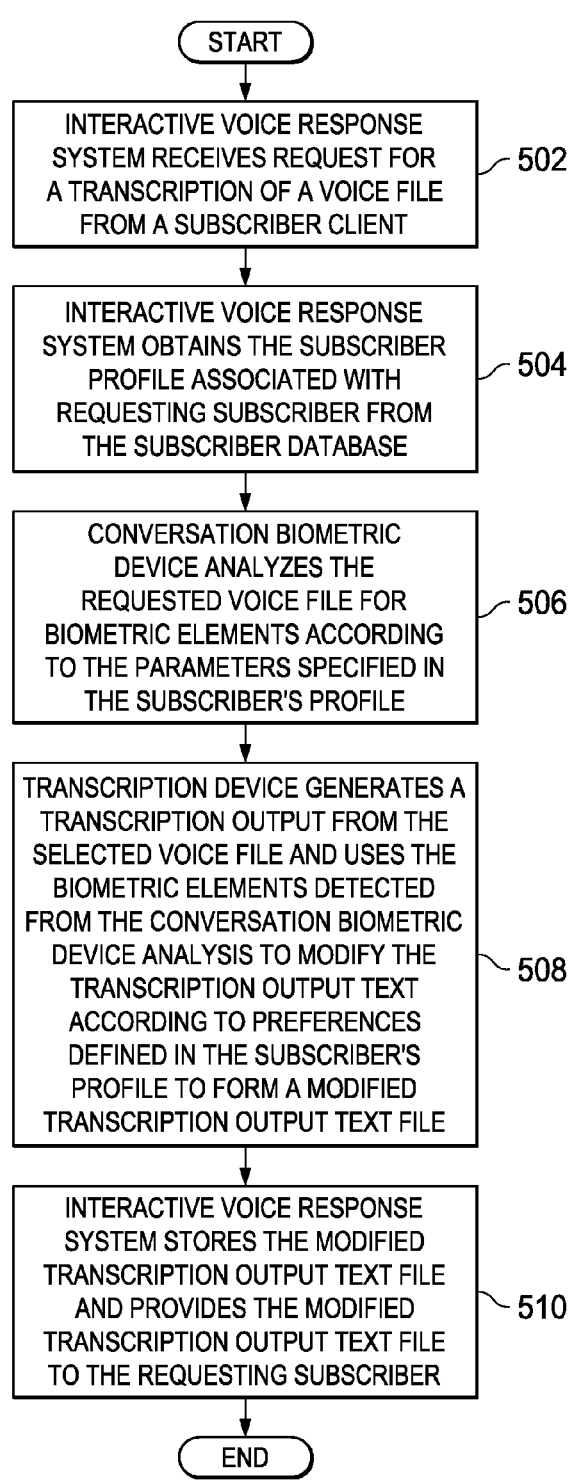
FIG. 4
FIG. 5

DETECTING AND COMMUNICATING BIOMETRICS OF RECORDED VOICE DURING TRANSCRIPTION PROCESS

BACKGROUND

1. Field

The disclosure relates generally to an improved data processing system, and more specifically to determining and communicating the biometrics of a recorded speaker in a voice transcription process.

2. Description of the Related Art

An interactive voice response (IVR) system is an automated telephone information system that can be accessed from all phone devices by a public switched telephone network (PSTN) or voice over Internet protocol (VoIP) Internet (wired or wireless). In general, these systems interact with users by voice and dual tone multi frequency (DTMF) signals, also known as touchtone signals, or the equivalent. Interactive voice response systems typically communicate with callers using a combination of fixed voice menus and real time data from databases, while allowing callers to make choices and enter information via the keypad or spoken input. These systems are widely used in call centers as well as a replacement for human switchboard operators. Interactive voice response systems allow callers to obtain needed information without the expense of employing call centers with human switchboard operators. Interactive voice response systems may also be used as a front end to call centers in order to reduce the number of calls that are handled by costly human agents.

Audio transcription is the process of converting audio files into written, typewritten, or printed form. A transcriber is a person who performs the transcription. Transcription is often used by companies and across industries—from medicine and insurance to airlines and automobiles, to corporate and media companies, and many more. There are also different types of audio transcription services, such as audio transcription for business groups, speakers, teleconferences, media companies, and production houses. In addition, audio transcription services are also available for transcribing press conferences, scripts, educational institutes, and corporate and government agencies.

SUMMARY

According to one embodiment of the aspects of the disclosure, a computer implemented method, apparatus, and computer program product are provided for determining and communicating biometrics of a recorded speaker in a voice transcription process. An interactive voice response system receives a request from a user for a transcription of a voice file. A profile associated with the requesting user is obtained, wherein the profile comprises biometric parameters and preferences defined by the user. The requested voice file is analyzed for biometric elements according to the parameters specified in the user's profile. Responsive to detecting biometric elements in the voice file that conform to the parameters specified in the user's profile, a transcription output of the voice file is modified according to the preferences specified in the user's profile for the detected biometric elements to form a modified transcription output file. The modified transcription output file may then be provided to the requesting user.

DESCRIPTION OF THE SEVERAL VIEWS OF THE DRAWINGS

FIG. 4 is a flowchart of a process for receiving and processing transcription parameters and preferences for individual subscribers in accordance with the illustrative embodiments; and FIG. 5 is a flowchart of a process for generating and communicating a modified transcription output for a voice file in accordance with the illustrative embodiments.

DETAILED DESCRIPTION

Figure 1:
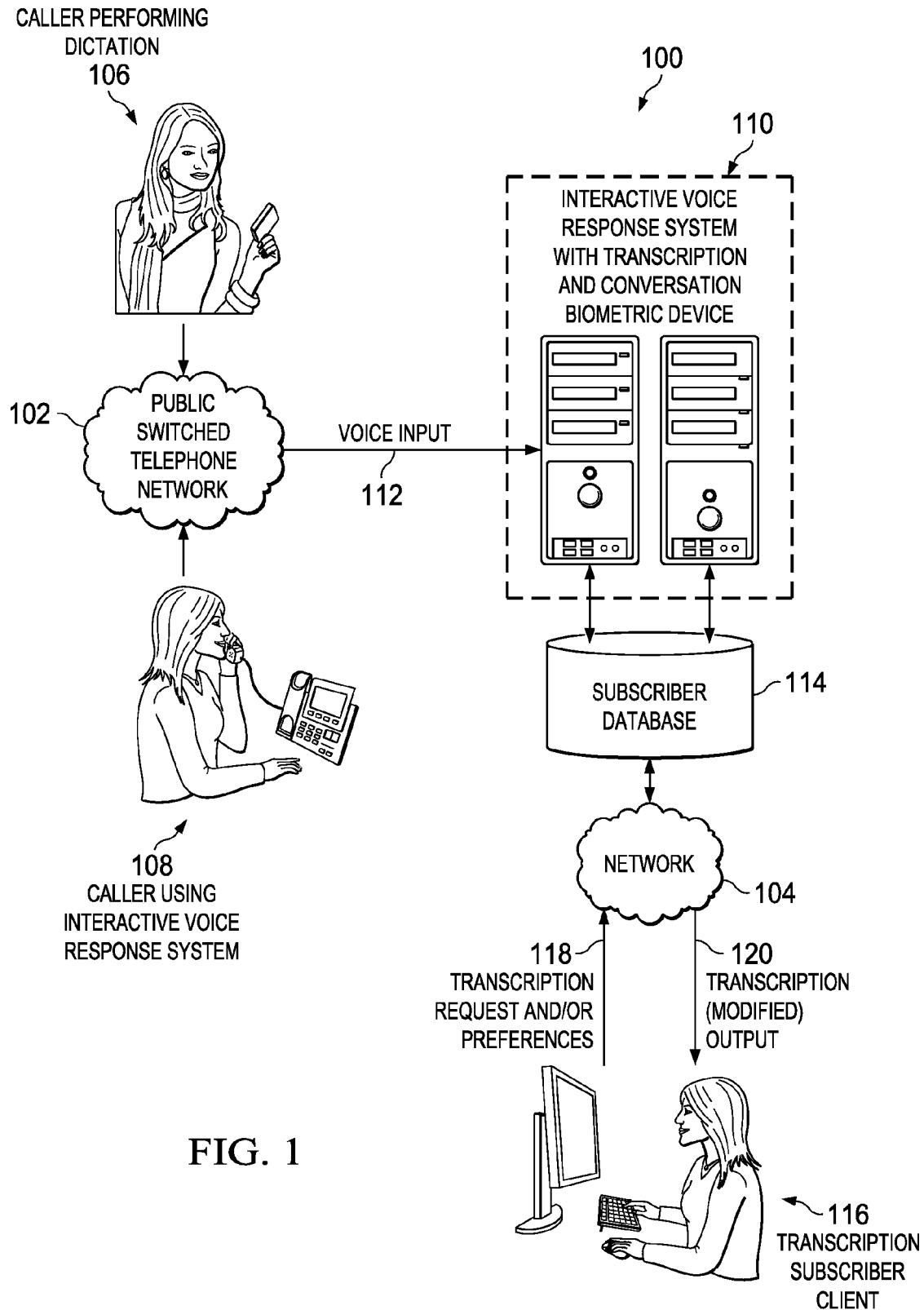
FIG. 1 is a pictorial representation of a distributed data processing system in which the illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the aspects of the disclosure may be written in any combination of one or more programming languages, including an object oriented programming language such as Java, Smalltalk, C++, Voice eXtensible Markup Language (VXML) or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As previously mentioned, audio transcription is the process of converting audio files into written, typewritten or printed form. However, the use of traditional human-based transcription can be labor-intensive and costly. For instance, a voice file is recorded and sent to a human transcriber, who then transcribes, edits, and sends the text back to a requesting user. Over the past few years, many corporations have developed speech recognition and transcription software, such as IBM's Websphere Voice Server for Transcription, to eliminate the need for labor- and cost-intensive human intervention. Users may dictate reports or records into devices including telephones, USB microphones, and mobile digital recorders, and their voice file inputs are processed by speech recognition technology in a transcription server and returned to the users as text.

Transcription services that provide human transcribers provide a benefit in that the transcriber, by listening to how a recorded user is speaking, may detect the disposition of the speaker and reflect this disposition in the generated transcription output. The disposition of the speaker may comprise emotions, tone of voice, approximate age, and/or other similar features of the speaker(s). Consequently, the transcriber can convey the emotions, etc. of the speaker by modifying how the text is displayed in the transcribed output. For example, the portions of the text may be modified to include bolding, shading, color coding, and rephrasing of the text, among others, to indicate the speaker's emotions in the voice file.

Although transcription servers solve the need for having access to transcription services 24 hour a day and 365 days a year, there is still a need for a transcription software solution that captures and conveys biometric elements of the voice file, such as the emotions, tone of voice, voice patterns, approximate age, and/or other biometric features of the speaker. Emotions may include, for example, anger, sadness, happiness, neutrality, laughter, boredom, defensiveness, urgency, among others. A voice file comprises a set of (one or more) speakers, and each speaker may comprise a set of (one or more) emotions.

The illustrative embodiments meet this need by providing an interactive voice response system comprising a transcription device and conversation biometrics device. The interactive voice response system provides 24 hour a day, 365 days a year transcription services, as well as modifies transcription text output to convey biometric elements detected in the voice input in the generated transcribed text output. The modified transcribed text output may be provided to users subscribing to the transcription services of the interactive voice response system.

The illustrative embodiments also allow individual subscribers to the transcription service to define which aspects of the biometric elements the subscriber wants emphasized in the modified transcribed text output. For instance, if a subscriber wants the transcription output text to show the emotions, urgency, or age of recorded/dictated audio voice, the transcription system may emphasize portions of the text that reflect these attributes of the voice file by color coding, bolding, shading, or paraphrasing sentences in the output text. Although particular modification examples are listed, it should be noted that these example modifications are non-exhaustive of the possible different modifications or combinations of modification that may be used in the illustrative embodiments to emphasize, in the text output, the detected biometric elements in the voice file. The interactive voice response system may provide a subscriber profile input feature to individual subscribers that enables each subscriber to define which biometric elements the subscriber would like to see detected in the voice file (i.e., define biometric parameters), as well as define how the detected biometric elements are to be emphasized in the modified transcription text output (i.e., define transcription text preferences). The input feature may comprise a graphical user interface through which the subscriber may enter the parameters and preferences, or the subscriber may provide the parameters and preferences via spoken input to the interactive voice response system. In either case, these parameters and preferences defined may be stored in individual subscriber profiles, and a subscriber may modify the subscriber's profile, such as to obtain visually different text outputs for a same voice file. Similarly, subscribers to the transcription of the same voice file may receive visually different text outputs based on the preferences defined in their individual subscriber profiles.

Figure 2:
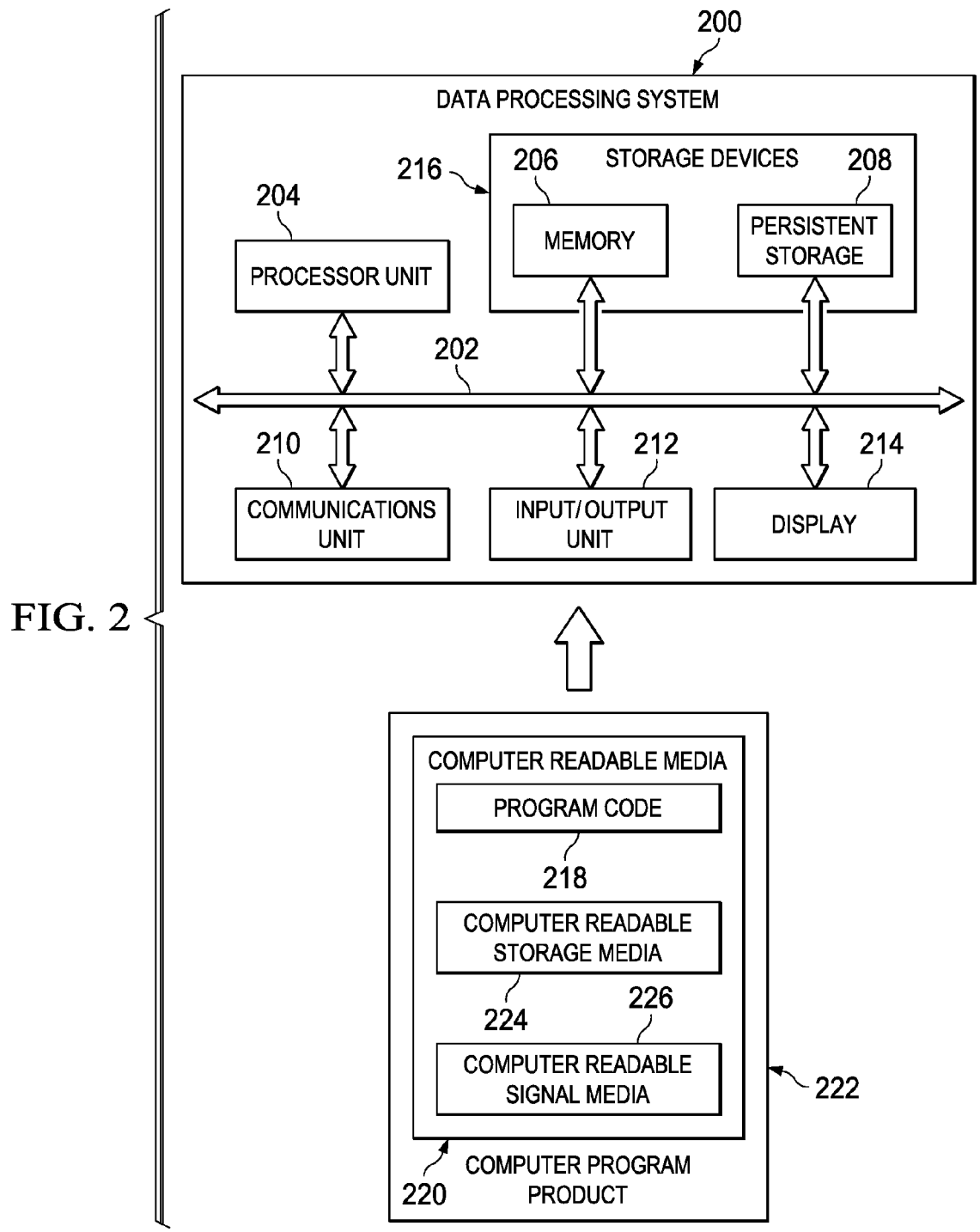
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a distributed data processing system in which the illustrative embodiments may be implemented. System 100 is a network of telephone devices and computers. System 100 contains public switched telephone network 102, which is a circuit switched network that is employed primarily for voice communications, and computer network 104, which is a medium used to provide communications links between various devices and computers connected together within system 100.

Public switched telephone network 102 is a circuit switched network that may support voice communications, such as those enabled by a standard telephone. Public switched telephone network 102 may include connections, such as wired communication links, wireless communications links, satellite communication links, fiber optic cables, and the like. As illustrated, public switched telephone network 102 may include a set of voice terminals. A voice terminal is a device for receiving voice input from a caller. In this illustrative example, voice terminal 106 comprises a telephone device through which a caller may provide voice input, such as dictation of a report or record. Voice terminal 106 is coupled directly to public switched telephone network 102. In another embodiment, voice terminal 106 may be coupled to public switched telephone network 102 via a computing device that supports voice over Internet protocol (VoIP). Voice terminal 108 comprises a caller using an Interactive Voice Response (IVR) system and may also be coupled directly to public switched telephone network 102 or through a computing device.

Public switched telephone network 102 is also connected to interactive voice response system 110. An interactive voice response system comprises an automated telephone answering system that responds with a voice menu and allows the user to make choices and enter information via a phone keypad or spoken input. Interactive voice response system 110 receives voice input files 112 from telephone users via public switched telephone network 102. Interactive voice response system 110 stores voice files received from public switched telephone network 102 in a database, such as subscriber database 114. Interactive voice response system 110 also comprises a transcription device and a conversation biometric device, which will be described further in FIG. 3. Interactive voice response system 110 may process and transcribe the voice input files stored in subscriber database 114 to generate corresponding transcription output text files.

Computer network 104 provides communications links between computers connected together within system 100. Network 104 may include connections, such as wire, wireless communication links, or fiber optic cables. Network 104 may be a publicly available network, a private network, or a combination of public and private networks. Network 104 may be the Internet with network 104 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network 104 may operate according to the Internet Protocol and route packets through its numerous switches and transmission paths. Of course, network 104 also may be implemented as a number of different types of networks, such as for example, an intranet, a local area network (LAN), or a wide area network (WAN).

As illustrated, network 104 includes a set of subscriber clients that are clients to the transcription services of interactive voice response system 110. Subscriber client 116 may be, for example, a personal computer or a network computer. Subscriber client 116 requests a transcription 118 of a voice file stored in subscriber database 114. Subscriber client 116 may also use a subscriber profile interface provided by interactive voice response system 110 to define or select biometric parameters and preferences regarding how the transcription output text is displayed to that subscriber client. Subscriber client 116 may define these biometric parameters and preferences prior to sending the transcription request to interactive voice response system 110 or at the time the transcription request is sent to interactive voice response system 110. When interactive voice response system 110 receives the request, interactive voice response system 110 processes the voice file in subscriber database 114 that is associated with the transcription request, modifies the transcription output based on the biometric parameters and preferences specified in the subscriber's profile to form a modified transcription output text, and provides the modified transcribed transcription text 120 corresponding to the voice file to subscriber client 116. Network 102 may include additional subscriber clients and other devices not shown.

Program code located in system 100 may be stored on a computer recordable storage medium and downloaded to a data processing system or other device for use. For example, program code may be stored on a computer recordable storage medium on interactive voice response system 110 and downloaded to subscriber client 116 over network 104 for use on subscriber client 116.

A person of ordinary skill in the art will recognize that the configuration of system 100 shown by example in FIG. 1 will vary depending upon implementation. For example, system 100 may include any number of public switches and public branch exchanges connected to public switched telephone network 102, each connected to any combination of telephones, answering machines, facsimile machines, IVR systems, a LAN and other telephone devices known in the art. In another example, system 100 may include any number of additional servers, clients, and other devices connected to network 104. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as interactive voice response system 112 or subscriber client 116 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
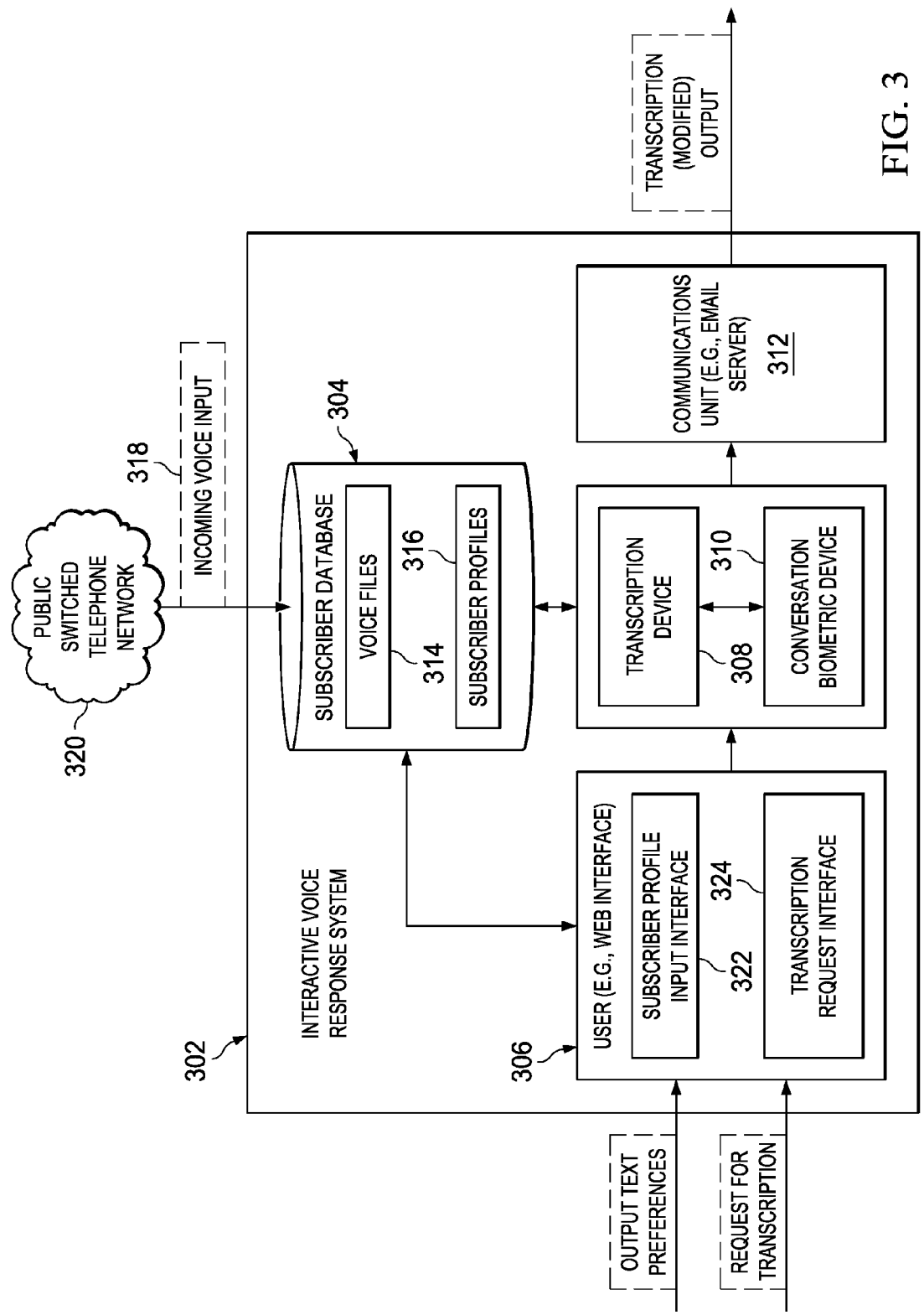
FIG. 3 is a diagram of an interactive voice response system for receiving and processing voice files for transcription in accordance with the illustrative embodiments.

FIG. 3 is a diagram of an interactive voice response system for receiving and processing voice files for transcription in accordance with the illustrative embodiments. Interactive voice response system 302 is an example of interactive voice response system 110 in FIG. 1. As illustrated, interactive voice response system 302 comprises subscriber database 304, user interface 306, transcription device 308, conversation biometric device 310, and communications unit 312.

Subscriber database 304 is an example of subscriber database 114 in FIG. 1. Subscriber database 304 comprises voice files 314 and subscriber profiles 316. Voice files 314 include incoming voice input 318 received from phone callers via public switched telephone network 320 and stored in subscriber database 304. Voice files 314 may include, but are not limited to, dictation files and recorded conference or meeting files. Subscriber profiles 316 comprise information about each subscriber of the transcription services of interactive voice response system 302, such as transcription parameters and preferences, and may include additional information such as subscriber billing information. Each subscriber may define biometric parameters to be used by the transcription device in the interactive voice response system 302 during transcription of a selected voice file. Biometric parameters are used to specify emotions, tones of voice, voice patterns, approximate age, and/or other biometric features of the speaker in the voice file that the subscriber would like the conversation biometric device to detect and the transcription device to emphasize in the transcribed output text in the manner defined by the subscriber. Voice patterns may include phrasing and syntax with which the conversation biometric device may use to approximate the age of the speaker in the voice file. Other selectable parameters, such as keyword parameters, may be defined in subscriber profiles 316 to allow the subscriber to specify keywords that the subscriber would like the transcription device to emphasize in the transcribed output text in the manner defined by the subscriber.

User interface 306 provides a subscriber profile input interface 322 through which a subscriber may define the subscriber's transcription parameters and preferences. In one example, subscriber profile input interface comprises a graphical user interface. In another example, an interactive voice response input interface may be used to receive a subscriber's transcription parameters and preferences via spoken input. Subscriber profile input interface 322 may include options selectable by the subscriber, including biometric parameters to be used by conversation biometric device 310 to identify portions of the transcription output text that should be modified, and preferences that specify how the subscriber would like the portions of a transcribed voice file within the parameters to be emphasized in the transcription output text. Default preferences may be used in cases where a subscriber has defined biometric parameters to be used by conversation biometric device 310 to identify portions of the transcription output text that should be modified, but the subscriber has not specified in the subscriber's profile any preferences on how the subscriber wants the detected biometrics to be displayed in the transcription output text. Subscriber profile input interface 322 may also include options to define keywords of interest. Keywords and parameter and preference selections made by a subscriber are stored in subscriber profiles 316 in subscriber database 304. User interface 306 also provides a transcription request interface 324 through which a subscriber may access (e.g., listen to) or request a transcription of a voice file stored in subscriber database 304.

Transcription device 308 may comprise a speech recognition engine that converts a requested voice file from subscriber database 304 into a transcribed output text file. In voice transcription, voice content is converted to text so it can be analyzed, impact decisions or trigger actions, improve productivity, and provide information accessibility. The transcription device uses state-of-the-art speech recognition technology to automatically transcribe speech content, such as phone calls, and lectures. Transcription device 308 may be implemented using any known transcription system, such as Websphere Voice Server for Transcription mentioned above. However, transcription device 308 should be adapted to be able to modify transcribed output texts based on the biometric analyses obtained from conversation biometric device 310. Transcription device 308 uses the biometric analyses performed by conversation biometric device 310 to generate modified transcriptions of the voice file. Transcription device 308 modifies the portions of the transcription output text that correspond to the identified portions of the voice file in the manner specified by the preferences in the subscriber's profile. Transcription device 308 may also detect biometric rules or instructions provided with the voice file that specify keywords in the voice file that should be emphasized in the transcription output text. Thus, the voice file itself may comprise instructions for modifying the transcription output text based on biometrics of the speaker or keywords in the voice file. Transcription device 308 may include these biometrics and keyword modifications to the transcription output text with the biometrics and keywords detected by conversation biometric device 310.

Conversation biometric device 310 is used to analyze recorded voice files and detect biometrics of the speaker(s) in the voice files. When analyzing a requested voice file for transcription, conversation biometric device 310 retrieves the profile associated with the subscriber requesting the transcription of the voice file. Conversation biometric device 310 uses the parameters and preferences in the subscriber's profile to analyze the requested voice file and determine the portions of the voice file that meet or fall within the parameters specified in the profile. The voice file may be analyzed for gender, emotion, accent, speed of the pitch, etc. A voiceprint is a set of measurable characteristics of a human voice that uniquely identifies an individual. Voice prints in the human voice may also reflect vocal tract physiology, variability, and various noise factors, which may be used by the biometric device to detect emotions in the voice print. Conversation biometric device 310 may be implemented using any known biometric system for detecting emotions, voice tones, or other biometric attributes of speakers from voice files, such as Nice Perform®, a product of Nice Systems.

Communications unit 312 is a communications device for providing the modified transcription output text (and/or voice file) to a requesting subscriber. In one embodiment, communications unit 312 may comprise an email server through which the modified transcription output text is sent to the subscriber.

FIG. 4 is a flowchart of a process for receiving and processing transcription parameters and preferences for individual subscribers in accordance with the illustrative embodiments. The process in FIG. 4 may be implemented by interactive voice response system 302 in FIG. 3. The process may be initiated in response to the interactive voice response system receiving a request for a subscription for transcription services from a subscriber client, such as subscriber client 116 in FIG. 1, or in response to a request by a subscriber client to update the current preferences in the subscriber's profile.

The process begins with the interactive voice response system providing a subscriber profile input interface comprising parameters and preferences to be defined or selected by a subscriber of the interactive voice response system's transcription services (step 402). Through the input interface, the subscriber client defines biometric (and/or keyword) parameters to be used by the conversation biometric device in the interactive voice response system when analyzing the selected voice file (step 404). The subscriber client may then define preferences on how the transcription device should process and emphasize the detected biometric elements in the modified transcription output text (step 406). For example, the subscriber may specify that if the biometric device detects that, during a portion of the voice file, the speaker in the voice file becomes angry or has a sense of urgency, the transcription device should emphasize that portion of the output by modifying that portion of the transcribed text to be displayed in red, for example. Other possible modifications of text may include, but are not limited to, color coding, shading, bolding, highlighting, rephrasing, or changing the font of the text. The interactive voice response system then stores the subscriber profile information in the subscriber database (step 408). The subscriber may change the preferences in the subscriber's profile if the subscriber wants to modify the types of biometric or keyword elements the conversation biometric device analyzes for the particular subscriber, as well as the way the detected biometric or keyword elements are to be emphasized in the transcription output provided to the particular subscriber.

FIG. 5 is a flowchart of a process for generating and providing a modified transcription output for a voice file in accordance with the illustrative embodiments. The process in FIG. 5 may be implemented by interactive voice response system 302 in FIG. 3.

The process begins with the interactive voice response system receiving a request for a transcription of a voice file from a subscriber client (step 502). The interactive voice response system obtains the subscriber profile associated with requesting subscriber from the subscriber database (step 504). The conversation biometric device in the interactive voice response system analyzes the requested voice file for biometric and keyword elements according to the parameters specified in the subscriber's profile (step 506).

The transcription device in the interactive voice response system generates a transcription output text from the selected voice file and uses the biometric elements detected from the conversation biometric device analysis to modify the output text to conform to the biometric preferences specified in the subscriber's profile (step 508). The modified transcription output text file comprises the transcribed text file that is edited by changing the way applicable portions of the text are emphasized or displayed in accordance with the subscriber's defined preferences. If the subscriber's profile does not contain a defined preference for a biometric element detected in the voice file, a default preference may be used by the transcription device. In one embodiment, the analyzing performed by the conversation biometric device in step 506 and the generating and modifying performed by the transcription device in step 508 are performed in parallel. The interactive voice response system stores the modified transcription output text file in the subscriber database and provides the modified transcription output text file to the requesting subscriber (step 510). The modified output text file may be provided to the subscriber in various ways, such as by allowing the subscriber to preview the modified output text stored in the subscriber database, or by emailing the modified output text to the subscriber. Steps 502 through 510 may be repeated when the subscriber changes the preferences in the subscriber's profile to modify the types of biometric or keyword elements the conversation biometric device examines for the particular subscriber, and/or the way the detected biometric or keyword elements are to be displayed in the transcription output provided to the particular subscriber.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the aspects of the disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the aspects of the disclosure for various embodiments with various modifications as are suited to the particular use contemplated.

The aspects of the disclosure can take the form of an entirely hardware embodiment, an entirely software embodiment or an embodiment containing both hardware and software elements. In a preferred embodiment, the aspects of the disclosure are implemented in software, which includes but is not limited to firmware, resident software, microcode, etc.

Furthermore, the aspects of the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the aspects of the disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles of the aspects of the disclosure, the practical application, and to enable others of ordinary skill in the art to understand the aspects of the disclosure for various embodiments with various modifications as are suited to the particular use contemplated.

What is claimed is:

1. A computer implemented method in a data processing system for determining and communicating biometrics of a recorded speaker in a voice transcription process, the computer implemented method comprising:
    receiving, by the data processing system, a request from a user for a transcription of a voice file stored in a memory of the data processing system;
    obtaining, by the data processing system, a profile associated with the requesting user, wherein the profile comprises biometric parameters and preferences defined by the user;
    analyzing, by the data processing system, the requested voice file for biometric elements according to the parameters specified in the user's profile;
    responsive to the data processing system detecting, in the voice file, biometric elements conforming to the parameters specified in the user's profile, modifying, by the data processing system, a transcription output of the voice file according to the preferences specified in the user's profile for the detected biometric elements to form a modified transcription output file;
    responsive to the data processing system determining that no preferences are specified in the user's profile, modifying, by the data processing system, the transcription output of the voice file according to default settings for the detected biometric elements to form the modified transcription output file; and
    providing, by the data processing system, the modified transcription output file to the requesting user.

2. The computer implemented method of claim 1, further comprising:
    receiving, by the data processing system, user selections in a profile for biometric parameters to be used by the data processing system when transcribing a voice file for the user;
    receiving, by the data processing system, user selections in the profile for preferences that specify how detected biometric elements are to be displayed in the modified transcription output file; and
    storing, by the data processing system, the profile in the memory of the data processing system.

3. The computer implemented method of claim 2, wherein the user selections in the profile are received via a graphical user interface provided to the user.

4. The computer implemented method of claim 2, wherein the user selections in the profile are received via user voice input to the data processing system.

5. The computer implemented method of claim 1, wherein the biometric parameters in the user's profile include keywords of interest, and wherein the preferences specify how detected keyword elements are to be displayed in the modified transcription output file.

6. The computer implemented method of claim 1, wherein modifying a transcription output of the voice file according to the preferences specified in the user's profile for the detected biometric elements to form a modified transcription output file includes at least one of shading, bolding, highlighting, rephrasing, or changing font or color of text.

7. The computer implemented method of claim 1, wherein the biometric elements include emotions, tone of voice, voice patterns, or approximate age of a speaker of the requested voice file.

8. The computer implemented method of claim 1, wherein the user is a subscriber to biometric transcription services of the data processing system.

9. The computer implemented method of claim 1, wherein the data processing system comprises a transcription device and a conversation biometric device, and wherein the analyzing step is performed by the conversation biometric device, and wherein the modifying step is performed by the transcription device.

10. The computer implemented method of claim 1, wherein the analyzing and modifying steps are performed in parallel.

11. The computer implemented method of claim 1, further comprising:
    modifying, by the data processing system, the transcription output of the voice file according to a set of biometric rules specified in the voice file.

12. A data processing system for determining and communicating biometrics of a recorded speaker in a voice transcription process, the data processing system comprising:
    a bus;
    a storage device connected to the bus, wherein the storage device stores computer usable code; and
    a processing unit connected to the bus, wherein the processing unit executes the computer usable code to receive a request from a user for a transcription of a voice file stored in a memory of the data processing system; obtain a profile associated with the requesting user, wherein the profile comprises biometric parameters and preferences defined by the user; analyze the requested voice file for biometric elements according to the parameters specified in the user's profile; modify a transcription output of the voice file according to the preferences specified in the user's profile for the detected biometric elements to form a modified transcription output file in response to detecting, in the voice file, biometric elements conforming to the parameters specified in the user's profile; modify the transcription output of the voice file according to default settings for the detected biometric elements to form the modified transcription output file in response to determining that no preferences are specified in the user's profile; and provide the modified transcription output file to the requesting user.

13. The data processing system of claim 12, wherein the processing unit further executes the computer usable code to receive user selections in a profile for biometric parameters to be used by the data processing system when transcribing a voice file for the user; receive user selections in the profile for preferences that specify how detected biometric elements are to be displayed in the modified transcription output file; and store the profile in the memory of the data processing system.

14. A computer program product stored on a computer readable storage device having computer readable program code embodied thereon that is executable by a data processing system for determining and communicating biometrics of a recorded speaker in a voice transcription process, the computer program product comprising:
  computer readable program code for receiving a request from a user for a transcription of a voice file stored in a memory of the data processing system;
  computer readable program code for obtaining a profile associated with the requesting user, wherein the profile comprises biometric parameters and preferences defined by the user;
  computer readable program code for analyzing the requested voice file for biometric elements according to the parameters specified in the user's profile;
  computer readable program code for modifying, in response to detecting, in the voice file, biometric elements conforming to the parameters specified in the user's profile, a transcription output of the voice file according to the preferences specified in the user's profile for the detected biometric elements to form a modified transcription output file;
  computer readable program code for modifying, in response to determining that no preferences are specified in the user's profile, the transcription output of the voice file according to default settings for the detected biometric elements to form the modified transcription output file; and
  computer readable program code for providing the modified transcription output file to the requesting user.

15. The computer program product of claim 14, further comprising:
  computer readable program code for receiving user selections in a profile for biometric parameters to be used by the data processing system when transcribing a voice file for the user;
  computer readable program code for receiving user selections in the profile for preferences that specify how detected biometric elements are to be displayed in the modified transcription output file; and
  computer readable program code for storing the profile in the memory of the data processing system.

16. The computer program product of claim 14, wherein the computer readable program code for modifying a transcription output of the voice file according to the preferences specified in the user's profile for the detected biometric elements to form a modified transcription output file includes at least one of shading, bolding, highlighting, rephrasing, or changing font or color of text.

17. The computer program product of claim 14, wherein the biometric elements include emotions, tone of voice, voice patterns, or approximate age of a speaker of the requested voice file.

18. The computer program product of claim 14, wherein the data processing system comprises a transcription device and a conversation biometric device, and wherein the computer readable program code for analyzing is executed by the conversation biometric device, and wherein the computer readable program code for modifying is executed by the transcription device.

19. The computer program product of claim 14, further comprising:
  computer readable program code for modifying the transcription output of the voice file according to a set of biometric rules specified in the voice file.

* * * * *